Jan. 19, 1943.                C. T. PEACOCK                2,306,536
                              DAMMING DEVICE
                         Filed April 21, 1941           2 Sheets-Sheet 1

INVENTOR.
CHARLES T. PEACOCK
BY Martin E. Anderson
ATTORNEY.

Jan. 19, 1943. C. T. PEACOCK 2,308,536
DAMMING DEVICE
Filed April 21, 1941 2 Sheets-Sheet 2
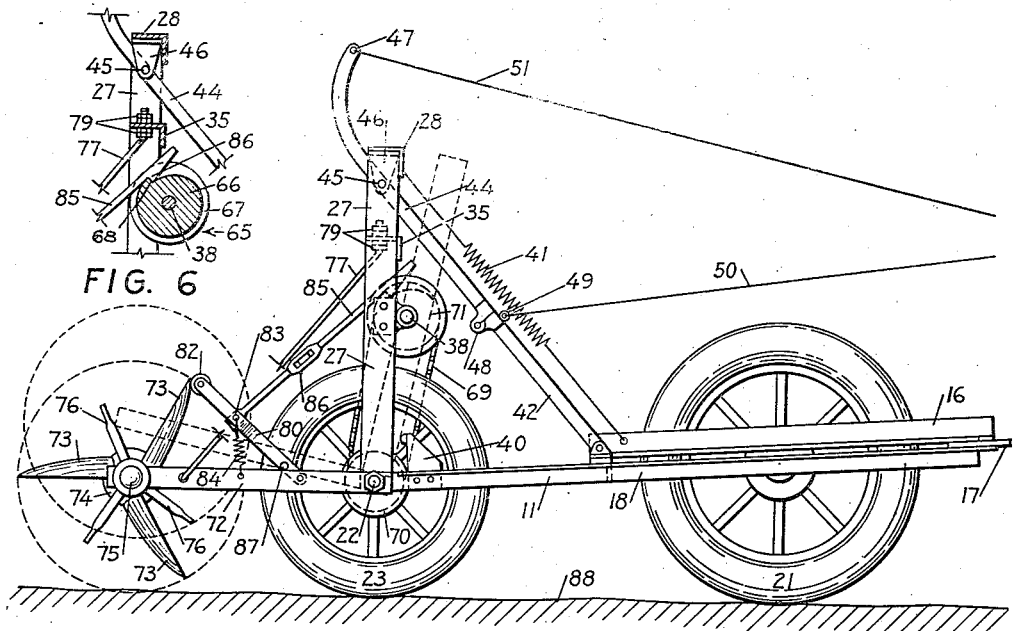
FIG. 6
FIGURE 2
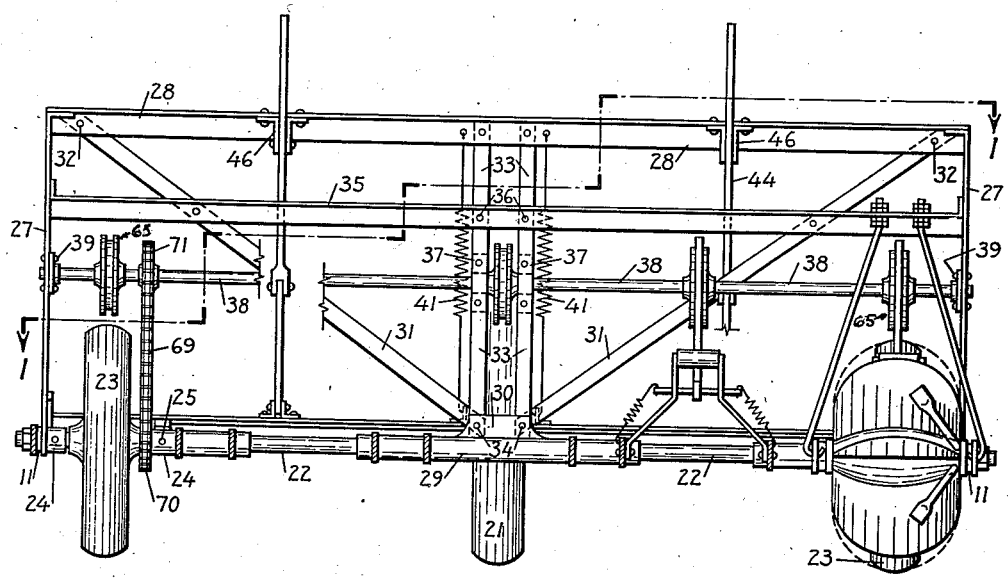
FIGURE 3
INVENTOR.
CHARLES T. PEACOCK
BY Martin E. Anderson
ATTORNEY.

Patented Jan. 19, 1943

2,308,536

UNITED STATES PATENT OFFICE 2,308,536

DAMMING DEVICE

Charles T. Peacock, Lincoln County, Colo.

Application April 21, 1941, Serial No. 389,501

7 Claims. (Cl. 97—55)

This invention relates to improvements in farm implements and has reference more particularly to an improved damming device of the general type disclosed and claimed in United States Letters Patent No. 1,892,002, granted December 27, 1932.

It is well known that certain parts of the United States, as well as large areas of other countries, do not receive sufficient rainfall to raise a crop each year. In such semi-arid regions, it is customary to raise a crop every two years and to so cultivate the land during the fallow season as to conserve as much of the moisture as possible to the end that the moisture received during the crop year will be sufficient for the crop and this makes it possible to raise one good crop every other year.

Several methods of farming to obtain the above result have been tried among which is the method of lister cultivation during the fallow season and damming of the lister furrows to prevent the water precipitated by heavy rains from running off. The practice of lister cultivation and damming the lister furrows during the fallow season has been found to be admirably adapted to conserve moisture and prevent the soil from being blown away and this method therefore prevents both forms of soil erosion.

The crop season from the time the ground is seeded until fallow cultivation begins, is at least twelve months and often longer than this, and since the present damming machinery is not suitable for use in damming the furrows after a lister seeder, it is evident that for at least one-half of the time, the land is left without the moisture conserving action of dams and therefore the water from the heavy rains that are characteristic of the rainfall in semi-arid regions, is free to flow along the lister furrows from higher to lower elevations during the crop growing and harvesting portion of the crop cycle.

I have found from actual operative tests that by employing a damming device properly designed for the purpose, it is practical to form spaced dams in the furrows after the seeder and that it is therefore practical to benefit from the moisture conserving and erosion preventative action of dammed lister furrows the full twenty-four months of every crop cycle.

It is the object of this invention to produce a completely self-contained damming device which can be attached to an ordinary lister for forming dams in the lister furrows and which can be also attached to any tractor device and even drawn by horses.

Another object is to provide a dam forming device that can be attached to an ordinary lister seeder for damming the seeded furrows without interfering with the grain seeded and which in addition, will serve to effect a uniform soil coverage for the seed.

A still further object is to produce a dammer of such construction that the depth of the dammer blades relative to the seed bed can be adjusted, each set of damming blades independently of the others, and;

A further object is to provide a dammer implement mounted on spaced wheels, or other supports, and provided with means for raising the dammer blades into inoperative position during transportation and when turning corners.

The above and other objects that may appear as this description proceeds are attained by means of a construction and an arrangement of parts that will now be described in detail, and for this purpose reference will be had to the accompanying drawings in which the invention has been illustrated, and in which:

Figure 2 is an end elevation looking in the direction of arrow 2, Figure 1;

Figure 3 is a view partly in elevation and partly in section, taken on line 3—3, Figure 1;

Figure 6 is a section taken on line 6—6, Figure 1 and shows the cam mechanism used for operating the detent.

Figures 1, 4, 5:
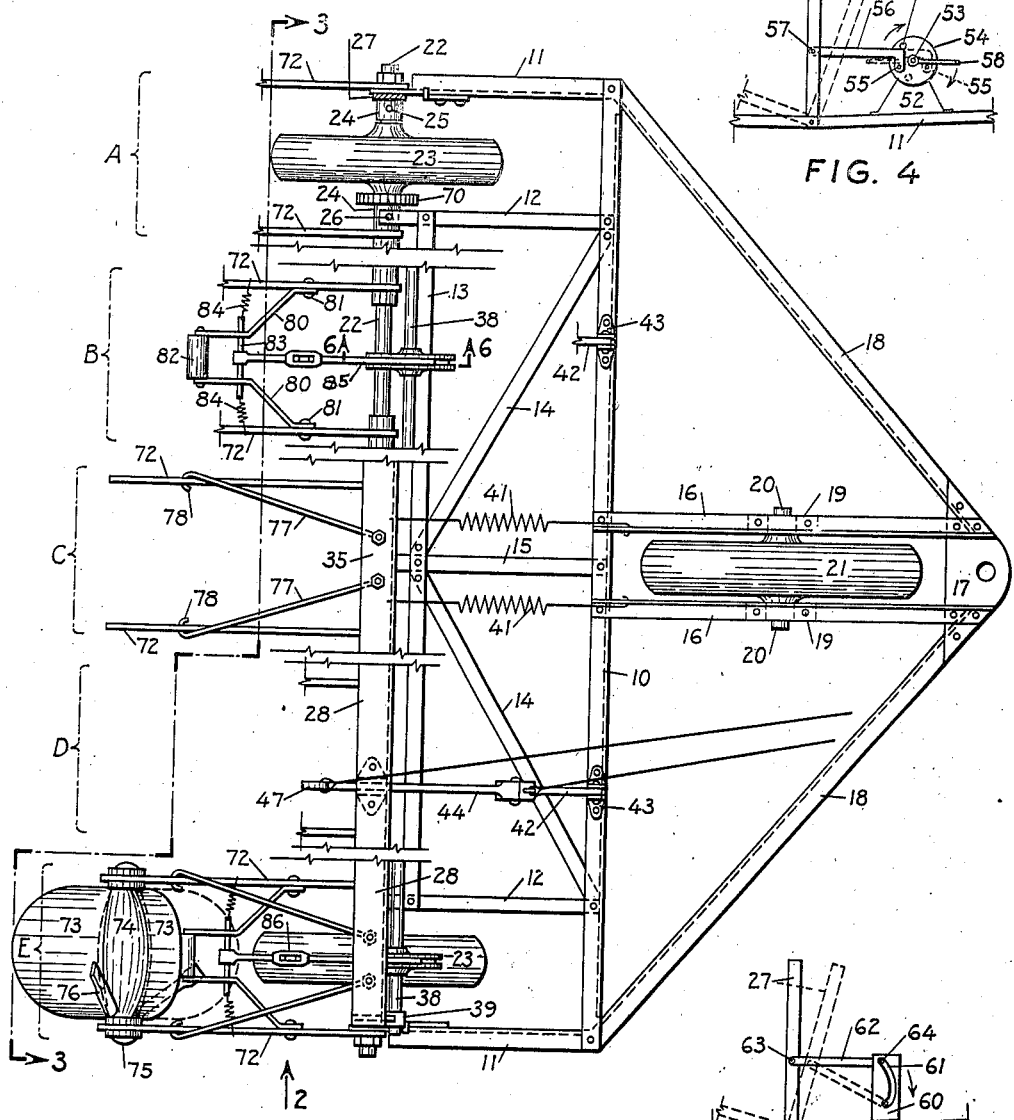
Figure 1 is a top plan view of the improved dammer, portions thereof having been removed and others broken away to more clearly disclose the construction, the parts being shown as they would appear when viewed along line 1—1, Figure 2.
Figure 4 is a detail showing proposed modification.
Figure 5 is a detail showing another modification.

In the drawings reference numeral 10 designates one of the longitudinal members of a horizontal frame whose end members have been designated by reference numeral 11. Extending rearwardly from corresponding points of frame member 10 are short bars 12, whose rear ends are connected by a bar 13 parallel with bar 10. Diagonal braces 14 connect bars 10 and 13 in the manner shown and another bar 15 extends from the center point of bar 10 to the center point of bar 13 so as to form a rigid structure. Extending forwardly or to the right of the frame just described, are two angle irons 16 whose forward ends are connected with a plate 17 from which diagonal members 18 extend rearwardly and are connected with the ends of bar 10. Secured to the under surface of angle irons 16 are bearings 19 in which is journaled an axle 20 that carries the wheel 21. The axle, instead of being journaled in the bearings 19, may be clamped against rotation and the wheel rotatably mounted on the axle. A shaft 22 extends parallel with members 10 and 13 and has its ends secured in openings in the rear ends of frame members 11. Supporting wheels 23 are mounted for rotation on shaft 22 in the spaces between frame members 11 and 12. These wheels are held in a predetermined longitudinal position by means of collars 24 that are secured to the shaft by means of pins or set screws 25. The frame members 12 have their rear ends secured to collars 24 by bolts 26 in the manner shown in the upper end of Figure 1.

Pivotally secured to the horizontal frame which has just been described is an upwardly ranging frame comprising end members 27 that have been shown as pivotally connected with the shaft 22. The upper ends of frame members 27 are connected by means of an angle iron 28. A sleeve 29 is carried by the shaft 22 at the point equidistantly spaced from the wheels 23. This sleeve has an upwardly extending flange 30 to which the lower ends of the diagonal braces 31 are attached in the manner shown in Figure 3. The upper ends of these braces are secured to the angle iron 28 by means of bolts or rivets 32. Vertical braces 33 have their upper ends secured to the vertical flange of angle iron 28 and their lower ends secured to the lower ends of the diagonal braces 31 by means of rivets 34. Extending between the vertical frame members 27 at a point beneath the angle iron 28 is an angle iron 35 and this is supported at its center from the vertical bars 33 by means of bolts or rivets 36. Bearings 37 are secured to the vertical braces 33 and serve as supports for a cam shaft 38 whose ends are journaled in bearings 39 secured to the end frame members 27. Since the upwardly ranging frame that has just been described is pivotally connected with the shaft 22, it can rock about the latter as a pivot, from the full line to the dotted line positions shown in Figure 2. Stops 40 are attached to the frame members 11 and so positioned that they are engaged by the end members 27 when the latter reach the dotted line position and therefore serve to limit the rocking movement in a clockwise direction when viewed as in Figure 2. Tension springs 41 extend from the vertical flange of angle iron 28 to angle iron 16 in the manner shown clearly in Figures 1 and 2. Since these springs are under tension, they exert a force tending to move the upwardly ranging frame in a clockwise direction and this frame will therefore assume the broken line position indicated in Figure 2 unless restrained by some means that opposes the action of these springs. As one means for holding the vertically ranging frame in a predetermined position relative to the horizontal frame, two overset toggles have been shown. Each of these toggles consists of a link 42 that is pivotally connected with the horizontal flange of frame member 10 by means of a bearing 43. The upper links 44 are pivotally connected at 45 with a bearing 46 that is secured to the horizontal flange of angle iron 28. It will be observed that links 44 extend upwardly beyond their pivotal connections with bearings 46 and terminate at points 47. Links 42 and 44 are pivotally connected at point 48 which is to one side of the center joining the upper and lower pivotal connections, thereby forming an overset toggle that resists longitudinal compression without buckling. Links 42 are provided, each with an eyelet 49 to which a rope 50 is attached and the upper ends of links 44 are provided with openings for the reception of ropes 51. It will be evident from an inspection of Figure 2 that if a sufficient tension is exerted on rope 50, the toggle will be broken and as a result of this the springs 41 will function to move the vertically ranging frame forwardly into the broken line position. When the frame is to be returned to the full line position, tension is exerted on ropes 51, whereupon the toggle will be moved to the full line position.

The mechanism just described for tilting the vertically ranging frame is merely illustrative of means for this purpose and it is to be understood that it can be replaced by other equivalent means, if this should be found desirable. Examples of other means that may be employed for this purpose are shown in Figures 4 and 5 in which alternative means have been illustrated. In Figure 4, the toggles, as well as the springs 41 have been dispensed with and their function is performed by means of a mechanism comprising two or more bearings 52 that are secured to the horizontal frame and to the upper ends of which a shaft 53 is rotatably connected. Shaft 53 carries two or more crank disks 54 to each of which a crank pin 55 is secured. A connecting rod 56 has one end bent at right angles and pivotally connected with the crank pin 55 while the other end is pivotally connected with the vertically ranging frame by means of a pivot 57. A handle 58 is connected with shaft 53 and by means of this, the shaft can be turned from an angle of 180 degrees. The crank disks are each provided with a pin 59 which engages the connecting rod to limit counterclockwise rotation of the shaft and crank disks. When the shaft 53 is rotated clockwise until the connecting rod reaches the broken line position, the vertical ranging frame will be moved to broken line position and held in this position due to the fact that the crank pin 55 is past dead center position.

In Figure 5 another frame adjusting means has been shown which consists of two or more vertically extending brackets 60, each of which has a curved guideway 61. Links 62 have their rear ends pivotally connected with frame members 27 at 63 and their forward ends provided with a lateral projection 64 that extends through the guideways 61. When links 62 are moved downwardly to the dotted line position, the vertically ranging frame will be tilted forwardly to broken line position.

The three frame adjusting means described above can, no doubt, be replaced by specifically different means and applicant therefore desires protection for any mechanical equivalents that may be employed to produce the function performed by the means described.

Referring now more particularly to Figure 6, it will be observed that shaft 38 is provided at spaced intervals with cams 65 which comprise a body 66 having spaced outwardly extending flanges 67. The cam body has a notch 68. These cams are nonrotatably connected with shaft 38 and the latter is rotated from one of the wheels 23 by means of a sprocket chain 69 that cooperates with a sprocket 70 on the wheel 23 and a co-operating sprocket 71 carried by shaft 38 in the manner quite clearly shown in Figures 2 and 3. When the machine is moving forwardly or to the right when viewed as in Figures 1 and 2, shaft 38 and the cams carried thereby will rotate in a clockwise direction when viewed as in Figure 2.

Carried by the shaft 22 are five scraper blade assemblies, each of which is positioned to correspond with a lister furrow. The machine illustrated is of sufficient width to cooperate with five lister furrows and therefore is provided with five scraper blade assemblies. Each scraper blade assembly consists of two bars 72 that are pivotally connected at their front ends to the shaft 22 and held in spaced relation by means of suitable collars and sleeves. Pivotally connected to the rear end of bars 72 is a rotatable scraper comprising three blades 73 that radiate from a center hub 74. The scraper blades 73 are preferably formed as shown in Figures 14 and 15 of Reissue Patent No. 21,675, dated December 24, 1940. Since the preferred construction is old, it will not be described in detail in the present application. The scraper blades are mounted for rotation on a stationary shaft 75 that is secured to the rear ends of bars 72 by any suitable means. Positioned between each pair of blades and extending radially from the hub are pins 76 that serve to assist in rotating the scraper blades when they are released at spaced intervals as will hereinafter be more fully described. Each bar 72 is connected with the horizontal flange of angle iron 35 by means of a rod 77. The lower ends of these rods are provided with hooks 78 that engage in openings in the bars 72 and their upper ends are threaded for the reception of nuts 79. The upper ends of bars 77 extend through openings in the horizontal flange of angle iron 35 and therefore by adjusting the nuts 79 the angular relation between the bars 72 and the vertically ranging frame can be adjusted within certain limits. Since each bar 72 is independently connected with angle iron 35, it is evident that each scraper blade assembly can be independently adjusted.

Each scraper blade assembly is provided with a detent comprising two bars 80 having their lower ends pivotally connected with bar 72 at points 81. Bars 80 are bent inwardly towards each other and rotatably secured to their outer ends are rollers 82. Rods 83 extend through the bars 80 and to the ends of these rods tension springs 84 are connected. The lower ends of these tension springs are connected with the bars 72 as shown most clearly in Figure 2. Pivotally connected with the rods 83 are upwardly extending rods 85. These rods are preferably formed in two parts and are provided with a turn buckle 86 by means of which their lengths can be adjusted. The upper ends of rods 85 are provided with a pawl 86 which normally rests on the outer surface of cam body 66 and once during each revolution of the cam this pawl drops into the notch 68 and is carried upwardly by the action of the cam, thereby raising the detent comprising the roller 82 so as to permit the scraper blades to rotate. It is evident from an inspection of Figure 6 that the cam will automatically disengage itself from the pawl 86, thereby permitting the detent to be returned in time to catch the next scraper blade. Suitable means is provided to limit the downward movement of the detent and as an example of this means a pin 87 has been secured to one or both of the bars 80 of each detent. The stop means comprising the pin 87 is merely illustrative as other equivalent means are employed for this purpose and the means above described and shown on the drawings has been selected on account of its simplicity and for the purpose of illustration only.

In Figure 1, only one of the scraper blade assemblies has been shown complete and it is to be understood that each group indicated by letters, A, B, C and D are formed in the manner shown at the bottom of Figure 1. As above pointed out, Figure 1 is a view taken along line 1—1, Figure 3 and parts have therefore been omitted so as to more clearly disclose the construction.

Let us now assume that a machine constructed in the manner above described is connected to some tractor apparatus and preferably positioned at the rear of a five-row lister provided with chisel shovels instead of the ordinary lister plows or behind a lister seeder. The parts are so proportioned that one of the scraper blade assemblies corresponds in position with a lister furrow. The bottom of the furrow has been indicated by line 88 in Figure 2. The lengths of rods 77 are adjusted so as to bring the bottom of the scraper blade 73 to any desired distance above the bottom of the lister furrow. When the machine is moved forwardly or to the right as in Figures 1 and 2, shaft 38 will be rotated from one of the wheels 23 and once during each revolution of shaft 38 the detent will be released, thereby permitting the scraper blades to turn so as to release the dirt that has accumulated and thereby form spaced dams. The pins 76 project into the ground forming the dam and therefore assures that the scraper blades will rotate through 120 degrees each time they are released. Since this damming device is to be used for the purpose of forming dams in lister furrows that have already been seeded, it is necessary that the scraper blade assemblies be adjusted carefully so as to leave a suitable depth of ground above the seed bed and this adjustment is effected by means of the nuts 79 and the rods 77.

In going towards or away from the field and in turning corners, it is desirable to raise the scraper blades into inoperative position and in Figure 2 this position has been indicated by broken lines. To effect this, the operator merely exerts the required pull on ropes 50, thereby breaking the toggles and allowing the springs 41 to move the upwardly ranging frame with its attached scraper assemblies to broken line position. After the turn has been made, a suitable tension applied to ropes 50 will move the parts into operative position. If other means are employed for this purpose, they must be operated by a suitable means in raising and lowering the scraper assemblies.

When the implement is provided with wheel 21, it is evident that the desired adjustment will be obtained regardless of whether the implement is attached to a tractor or drawn by a team of horses. It is possible to dispense with wheel 21 if the implement is rigidly attached to a lister or to a lister seeder. Wheel 21, however, is desirable and as it adds only a comparatively small amount to the cost of construction, it is usually employed.

From the above description, it will be apparent that the implement described embodies as its essential elements a substantially horizontal frame to which an upwardly ranging frame is adjustably connected. One or more scraper assemblies are attached to the upwardly ranging frame by means which permit relative adjustment and associated with the two adjustable frames is means for holding them in a predetermined angular relation and also tilting the vertically ranging frame forwardly for the purpose of raising the scraper blades so as to bring them into inoperative position at turns and when transporting the implement from place to place.

Where only a single scraper assembly is employed instead of a plurality, it will embrace the parts included by the bracket E in Figure 1 and consequently requires only one wheel 23, or other equivalent support. The front end of the horizontal frame can be attached to the beam of a lister in which case wheel 21 may also be dispensed with.

Having described the invention what is claimed as new is:

1. A damming device comprising, in combination, a horizontal frame, a supporting wheel therefor, an upwardly ranging frame pivotally attached at its lower end to the horizontal frame, means for tilting the frames relative to each other, a scraper assembly pivotally attached at its forward end to the horizontal frame, and means for adjustably connecting the scraper assembly with the upwardly ranging frame to limit the downward movement of the scraper blades.

2. A damming device comprising, in combination, a horizontal frame having a support, an upwardly ranging frame pivotally attached at its lower end to the horizontal frame, means interconnecting the two frames for effecting a relative tilting action and for holding them in a predetermined position, a scraper blade assembly pivotally connected at its forward end to the horizontal frame, and means for adjustably connecting the scraper blade assembly with the upwardly ranging frame.

3. A damming device comprising, in combination, a horizontal frame, at least two supporting wheels therefor, an upwardly ranging frame pivotally attached at its lower end to the horizontal frame, means for tilting the frames relative to each other, a scraper blade assembly pivotally attached at its forward end to the horizontal frame, means for adjustably connecting the scraper blade assembly with the upwardly ranging frame to limit the downward movement thereof, the scraper blade assembly comprising a plurality of interconnected scraper blades, said scraper blades being mounted for rotation, a detent mechanism for holding the scraper blades in operative position, a cam rotatably connected with the vertical frame, a pawl member connected at one end with the detent mechanism, the other end being in operative engagement with the cam, and means for adjusting the length of the pawl member to compensate for adjustment between the scraper assembly and the vertical frame.

4. A damming device, comprising, in combination, a substantially horizontal frame, two axially aligned supporting wheels, a third supporting wheel spaced from the axis of the other wheels whereby the frame will have a three-point support, a vertically ranging frame pivotally attached at its lower end to the horizontal frame, means for tilting the vertically ranging frame relative to the horizontal frame and for latching it in a predetermined position, a scraper blade assembly having one end pivoted to the horizontal frame, and adjustable means attaching the scraper blade assembly with the vertically ranging frame.

5. A dam forming device, comprising, in combination, a substantially horizontal frame, at least two supporting wheels therefor, an upwardly ranging frame pivotally attached at its lower end to the horizontal frame, means for tilting the frames relative to each other and for latching them in a predetermined position, a scraper blade assembly pivotally attached to the horizontal frame, and positioned to the rear thereof, said scraper blade assembly comprising two spaced bars, dam forming blades positioned between the bars and mounted for rotation, means connecting the scraper blade assembly to the upwardly ranging frame to limit the downward movement of the scraper blades, said last named means comprising means for adjusting the angular relation between the scraper blade assembly and the vertical frame, detent means carried by the bars for arresting rotation of the blades and holding them in operative position, means responsive to the rotation of the supporting wheels for operating the detent to periodically release the blades as the device is moved forwardly, and means for adjusting the detent means to correspond to the angular adjustment between the scraper blade assembly and the vertical frame.

6. A self-turning scraper comprising a hub having equiangularly spaced dam forming scraper blades radiating therefrom, and turn assisting pins secured to the hub near its end and projecting from the hub into the spaces between each two adjacent blades, the pins being inclined towards the middle of the hub.

7. A self-turning scraper comprising, a hub having at least three equiangularly spaced dam forming scraper blades radiating therefrom, and turn assisting pins projecting from near the ends of the hub into the spaces between each two adjacent blades, the pins being inclined inwardly towards the middle of the hub.

CHARLES T. PEACOCK.